United States Patent [19]

Cirkel et al.

[11] Patent Number: 4,556,981

[45] Date of Patent: Dec. 3, 1985

[54] LASER OF THE TE TYPE, ESPECIALLY A HIGH-ENERGY LASER

[75] Inventors: Hans-Jürgen Cirkel; Willi Bette; Reinhard Müller, all of Erlangen, Fed. Rep. of Germany

[73] Assignee: Kraftwerk Union Aktiengesellschaft, Mülheim, Fed. Rep. of Germany

[21] Appl. No.: 416,017

[22] Filed: Sep. 8, 1982

[30] Foreign Application Priority Data

Sep. 14, 1981 [DE] Fed. Rep. of Germany ....... 3136447

[51] Int. Cl.⁴ .............................................. H01S 3/097
[52] U.S. Cl. ....................................... 372/86; 372/87; 372/83
[58] Field of Search ............... 378/86, 87, 55; 372/82, 372/83

[56] References Cited

U.S. PATENT DOCUMENTS

| | | | |
|---|---|---|---|
| 3,781,710 | 12/1973 | Boudinet et al. | 372/86 |
| 4,041,414 | 8/1977 | Richardson et al. | 372/86 |
| 4,342,114 | 7/1982 | Luck | 372/87 |
| 4,365,337 | 12/1982 | Cirkel et al. | 372/82 |
| 4,375,690 | 3/1983 | Tabata et al. | 372/82 |
| 4,380,079 | 4/1983 | Cohn et al. | 372/87 |
| 4,412,333 | 10/1983 | McLellan | 372/87 |
| 4,417,342 | 11/1983 | McKee | 372/86 |
| 4,449,220 | 4/1984 | Chenausky et al. | 372/87 |
| 4,450,566 | 5/1984 | Marchetti et al. | 372/87 |

Primary Examiner—William L. Sikes
Assistant Examiner—Léon Scott, Jr.
Attorney, Agent, or Firm—Herbert L. Lerner; Laurence A. Greenberg; Adam A. Jorgensen

[57] ABSTRACT

Laser of the TE type, including a gas-tight housing defining a laser chamber having a gas space, at least two laser electrodes disposed parallel to the optical axis of the laser within the housing, the electrodes being disposed mutually opposite and at a given distance from each other, excitation of the laser being provided by an arc-free capacitor discharge being as homogeneous as possible in the gas space between the electrodes, a pre-ionization device disposed within the housing, current leads and a current return disposed in the housing, each of the electrodes being connected to one of the current leads and current return, a device disposed in the laser chamber for conducting laser gas therethrough, a pulse-forming network having a capacitor contact surface and being connected to the current leads and current returns, the laser electrodes being in the form of at least two subelectrodes facing toward the pulse-forming network and subelectrodes facing away from the pulse-forming network, an electrode bridge connected to the subelectrodes facing away from the pulse-forming network, the subelectrodes of opposite electrodes defining subdischarge spaces therebetween and a subelectrode space between the subdischarge spaces, and insulation jackets disposed on the current leads, the current leads being extended in an insulated manner from the electrode bridge through the subelectrode space, through the current return and to the capacitor contact surface.

18 Claims, 6 Drawing Figures

LASER OF THE TE TYPE, ESPECIALLY A HIGH-ENERGY LASER

The invention relates to a laser of the TE type, particularly a high-energy laser, with excitation by a capacitor discharge free of arcing and as homogeneous as possible, in the gas space between at least two first and second electrodes which extend parallel to the optical axis of the laser within a laser chamber, are disposed opposite each other at a distance, are disposed in a gas-tight housing of the laser chamber with a pre-ionization device and are connected to a current lead or current return, respectively, the laser chamber is provided with means for conducting the laser gas through and the current leads and current returns are connected to a pulse forming network connected in a Blümlein or charge transfer circuit.

TE (transversely excited) lasers are suitable particularly for photochemical applications in the industrial sphere. For these applications, energies as high as possible with long pulse durations and high repetition rates are desirable. At the same time, a high electric efficiency for the generation of laser light is desirable.

For physical reasons, only a maximum energy per volume unit is possible, so that it appears advantageous to excite volumes as large as possible. With high repetition rates it is necessary to exchange the gas several times between laser pulses, so that the laser gas must flow with a relatively high velocity between the electrodes of the laser. For economic and technological reasons, the flow resistance must be minimized in order to keep the required power of the blower for the gas circulation low. The pulse formation by the excitation circuit is furthermore of special importance for obtaining high electrical efficiencies, as is explained in detail in allowed U.S. application Ser. No. 396,651, filed July 9, 1982, owned by the assignee of the instant application. In that application embodiment examples for the pulse-forming network, which may be constructed, for instance, as a Blümlein circuit or a charge-transfer circuit, are given.

For high-energy lasers, there are a number of requirements which are in part contradictory. Thus, the laser chamber and the leads to the corresponding pulse-forming network should be constructed with an inductance that is as low as possible. This can be achieved by a construction which is as compact as possible. However, this results in the danger of the formation of sliding sparks on the inside walls of the laser housing, the cause of which are essentially the so-called tangential field components. These potential and sliding-spark problems are further aggravated by the fact that so-called auxiliary electrodes for pre-ionization are built into the discharge space, such as is explained in U.S. application No. 303,167, filed Sept. 17, 1981 owned by the assignee of the instant application.

For controlling the potential and sliding-spark problems, it was proposed in U.S. Pat. No. 4,503,542, to essentially form cavities in the insulating material of the housing jacket between one laser electrode and the current return surrounding it, and to insert shield electrodes into these cavities, which are connected to the potential of the laser electrode disposed within the shield electrode. This previously proposed laser assembly relates to lasers through which the gas flows longitudinally as well as transversely, and it is the point from which the invention starts. It is a particular problem of the previously proposed laser that even if the shielding measures explained above are introduced, a minimum distance for the current return must be maintained, which brings about an increase of the inductance of the laser housing and sets a lower limit for the inductance, which is given in particular by the dielectric strength of the insulating material used. This is true particularly in the integration of the auxiliary electrodes for pre-ionizing into the discharge space.

It is accordingly on object of the invention to provide a laser of the TE type, particularly a high-energy laser according to the generic term, which overcomes the hereinafore-mentioned disadvantages of the heretofore-known devices of this general type, and which, while having very low intrinsic inductance, has a relatively large discharge volume. The new laser should basically be usable for longitudinal as well as for transversal gas flow and should be changeable from the transversal into the longitudinal type of construction and vice versa with relatively few structural changes. In its transversal construction, it should have a particularly low flow resistance, so that the repeated gas replacement between each two laser pulses is made possible with a relatively small amount of pumping power. A further object is to construct the laser in such a way that modular construction is possible.

With the foregoing and other objects in view there is provided, in accordance with the invention, a laser of the TE type, particularly a high-energy laser, comprising a gas-tight housing defining a laser chamber having a gas space formed therein, at least two first and second laser electrodes disposed parallel to the optical axis . of the laser within the housing of the laser chamber, the electrodes being disposed mutually opposite and at a given distance from each other, excitation of the laser being provided by an arc-free capacitor discharge being as homogeneous as possible in the gas space between the electrodes, a pre-ionization device disposed within the housing of the laser chamber, current leads and a current return disposed in the housing of the laser chamber, each of the electrodes being connected to one of the current leads and current return, means disposed in the laser chamber for conducting laser gas therethrough, a pulse forming network, in a Blümlein or charge transfer circuit, having a capacitor contact surface and being connected to the current leads and current return, each of the mutually opposite laser electrodes being in the form of at least two subelectrodes, the subelectrodes of one of the electrodes facing toward the pulse forming network and the subelectrodes of the other of the electrodes facing away from the pulse forming network, an electrode bridge connected to the subelectrodes of the electrode facing away from the pulse forming network, the subelectrodes of the respective mutually opposite electrodes defining subdischarge spaces therebetween and a subelectrode space between the subdischarge spaces, and insulation jackets disposed on the current leads, the jacketed current leads being extended in an insulated manner from the electrode bridge of the subelectrodes of the other electrodes through the subelectrode space, through the current return of the subelectrodes of the one electrodes adjacent the pulse forming network and to the capacitor contact surface of the pulse forming network.

In accordance with another feature of the invention, the laser gas flow is transverse to the optical axis of the laser, and the insulation jacketed current leads are in the form of individual bodies being mutually spaced apart by a given distance along the optical axis of the laser, forming spaces for the laser gas flow transverse to the optical axis of the laser.

In accordance with a further feature of the invention, the laser gas flow is transverse to the optical axis of the laser, and the insulation jacketed current leads are in the form of a continuous plate-shaped body having perforations formed therein forming spaces for the laser gas flow transverse to the optical axis of the laser.

In accordance with an added feature of the invention, the laser gas flow is parallel to the optical axis of the laser, and the insulation jacketed current leads are in the form of continuous plate-shaped bodies without cutouts.

In accordance with an additional feature of the invention, the subelectrodes of the one electrodes facing toward the pulse forming network are disposed at a distance from the insulation jacketed current leads defining further spaces therebetween, and including shield electrodes having insulation jackets and being electrically connected to the ground potential of the current return and being extended into the further space.

In accordance with again another feature of the invention, the pre-ionization device includes electrodes disposed parallel to the optical axis of the laser at a small distance from the surface of the laser electrodes in the gas space, and the shield electrodes are extended transverse to the optical axis of the laser into the gas space at least as far as the vicinity of the subelectrodes of the one laser electrodes facing toward the pulse forming network and the vicinity of at least one of the pre-ionization electrodes.

In accordance with again a further feature of the invention, the shield electrodes are blade-shaped or are rows of pins and are extended into the gas space from the current return of the one subelectrodes, and including a substantially U-shaped insulation jacket surrounding the shield electrodes.

In accordance with again an added feature of the invention, the current leads are in the form of pin or bolt-shaped conductor rods being tapered in a region thereof extended through the gas space between opposite subelectrodes of the mutually opposite electrodes, forming cavities between the conductor rods and the insulating jackets.

In accordance with again an additional feature of the invention, the conductor rods have a uniform or steady transition region from a full cross-sectional area to a tapered cross-sectional area thereof.

In accordance with yet another feature of the invention, the cavities extend in direction transverse to the optical axis of the laser at least from the vicinity of the surfaces of the subelectrodes of the one electrodes adjacent the pulse forming network to the vicinity of the surface of the subelectrodes of the other electrodes facing away from the pulse forming network.

In accordance with yet a further feature of the invention, the insulation jackets of the current leads and shield electrodes are structurally combined in vicinity of the shield electrodes into an enlarged base portion having chambers formed therein for receiving the shield electrodes.

In accordance with yet an added feature of the invention, the subelectrodes form two subdischarge spaces, and including ray deflection devices, such as mirrors, prisms or grids, optically connecting the two subdischarge spaces in tandem between the subelectrodes.

In accordance with yet an additional feature of the invention, the laser chamber is subdivided into a plurality of chambers enclosing the subdischarge spaces each having two opposite subelectrode pairs, the chambers being aligned transverse to the optical axis of the laser forming a multiple laser system.

In accordance with still a further feature of the invention, there are provided ray deflection devices optically connecting the chambers of the multiple laser system enclosing the subdischarge spaces in series.

In accordance with an additional feature of the invention, there are provided means for generating a longitudinal laser gas flow.

In accordance with a concomitant feature of the invention, there are provided optical or uni-directional elements disposed in a path between the ray deflection devices. The optical elements are preferably permeable in the desired beam direction and are in the form of saturable absorbers, Faraday rotators, or the like.

It is a characteristic of the invention that the subdischarge spaces surround the metallic current feed. Because of the symmetrical construction which is thus made possible herein, a completely identical behavior of the laser pulses can be achieved. The new high energy laser construction is also particularly well suited for a multiple assembly in a sort of modular construction, i.e. it is not limited to two oppositely disposed subelectrode pairs. Many components are provided herein several times, i.e., in multiples, such as the partial electrodes, the current feeds and the insulation, the shielding electrodes with their insulating material jacket, the auxiliary electrodes for pre-ionization, etc., which favors a manufacture according to the building block principle.

Other features which are considered as characteristic for the invention are set forth in the appended claims.

Although the invention is illustrated and described herein as embodied in a laser of the TE type, especially a high-energy laser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 is a fragmentary cross-sectional view corresponding to FIG. 2 for longitudinal laser-gas flow, wherein the cross section I'—I' in FIG. 4 corresponds to the presentation according to FIG. 1, for which reason a separate presentation of the cross section I'—I' has been dispensed with;

Figure 1:
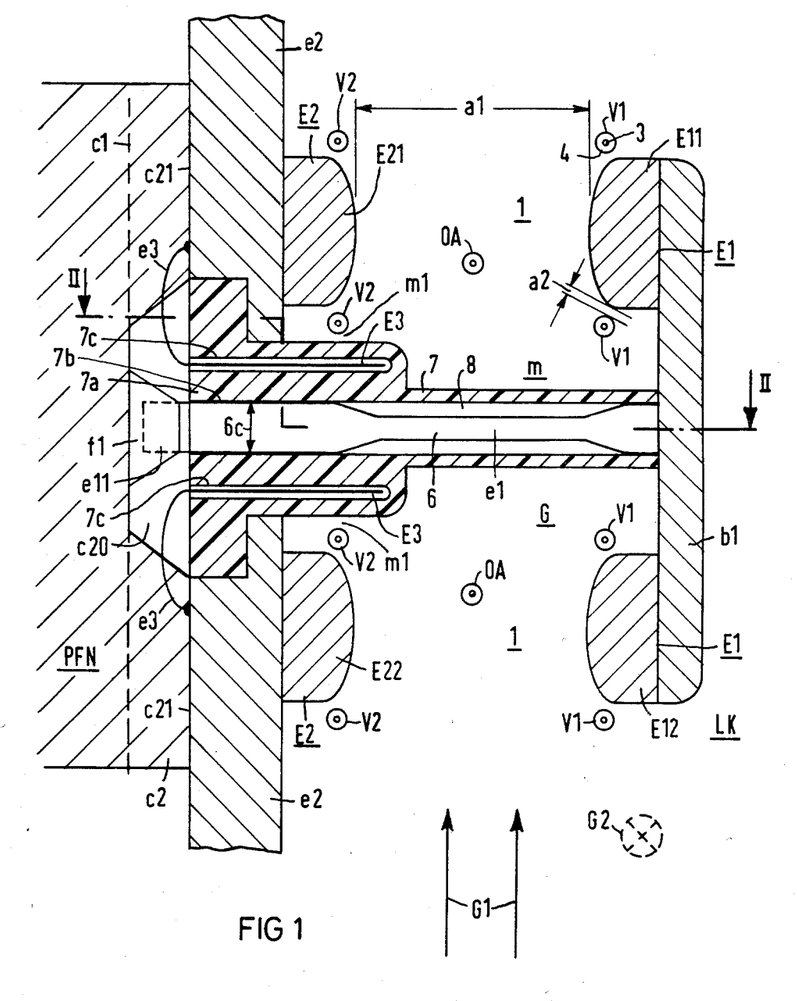
FIG. 1 is a fragmentary, diagrammatic, cross-sectional view taken along the line I—I in FIG. 2, in the direction of the arrows, showing a view in the direction of the optical axis of the laser, a laser chamber for a high-energy laser according to the invention with a transversal laser-gas flow G1, and an indication at reference symbol G2 in dashes that this laser system is basically also suited for longitudinal laser-gas flow, the parts of the wall of the housing being omitted for simplification and the pulse-forming network merely being indicated in the left half of the Figure.
Figure 2:
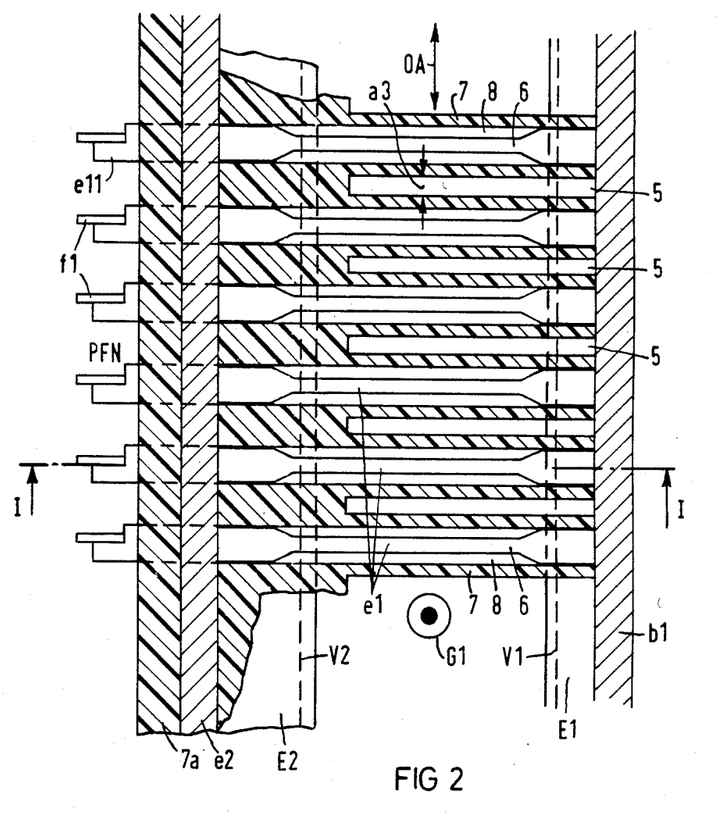
FIG. 2 is a fragmentary, longitudinal-sectional view of FIG. 1, taken along the line II—II in FIG. 1, in the direction of the arrows, and showing a view in the direction of the transversal laser-gas flow.
Figure 3:
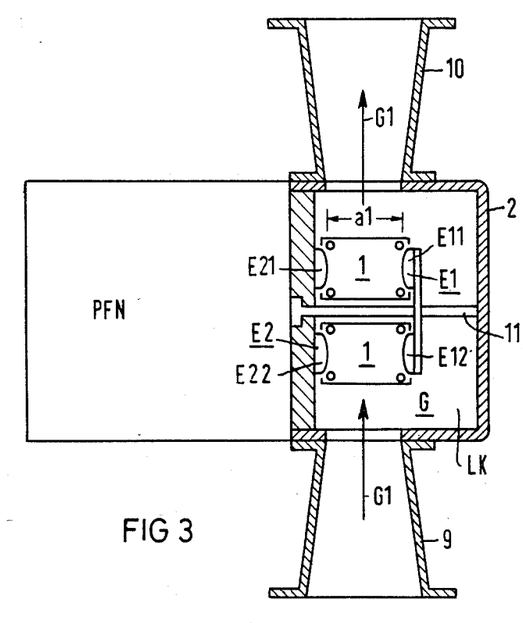
FIG. 3 is a cross-sectional view of the total high-energy laser on a reduced scale compared to FIG. 1, and being opened at the end face, with a housing, an inflow and an outflow funnel as well as a pulse-forming network.

Referring now to the figures of the drawing and first particularly to FIG. 1 thereof, there is seen a high-energy laser of the TE type which operates in accordance with the principle of excitation by an arc-free capacitor discharge being as homogeneous as possible in a gas space G between at least two first and second electrodes E1 and E2. The electrodes E1 and E2 are extended parallel to an optical axis OA of the laser within a laser chamber LK (see FIG. 3), and are disposed opposite each other at a distance a1. As will be explained later on, the electrodes are divided into electrode pairs E11, E12 and E21, E22, respectively. The electrodes E1, E2 and the pre-ionization devices V1, V2 are disposed within a gas-tight housing 2 of the laser chamber LK (FIG. 3). The pre-ionization devices V1, V2 are constructed, in the embodiment example shown, as rod-shaped auxiliary electrodes, which are seen in FIGS. 1 and 2 to include an inner conductor 3 and a dielectric 4 surrounding the conductor 3. The pre-ionization devices V1, V2 are disposed parallel to the axis of the laser and are spaced from the respective corresponding partial electrode E11, E12 and E21, E22 by a breakdown gap a2. The construction, disposition and connection of such pre-ionization rods or auxiliary electrodes and electrodes are described in detail in U.S. patent application Ser. No. 303,167, filed Sept. 17, 1981; they are therefore not discussed in further detail herein.

The electrode E1, i.e. its two partial or subelectrodes E11, E12, which are disposed on the side of the device facing away from a pulse-forming network PFN, are connected through an electrode b1 to a lead el; the electrode E1, i.e. its two subelectrodes E21, E22 which are adjacent the pulse-forming network PFN, are connected to a current return e2, which may also be in the form of a conducting bridge between the subelectrodes E21, E22 but not necessarily so. The current return e2 is formed by a large metal plate which preferably defines ground potential at the same time. The electrical connection of the electrodes of a high-energy laser with a pulse-forming network as well as the circuit of this network itself is described in greater detail in German-Published, Non-Prosecuted Application No. 29 32 781, corresponding to U.S. Pat. No. 4,365,337, so that it need not be discussed herein in detail. It should merely be mentioned that the pulse-forming network PFN may be connected, for instance, in a Blümlein or in a charge-transfer circuit, and that part of this network is also a fast high-voltage switching gap, which can be provided, for instance, in the form of thyratrons, a spark gap or a plasma switch. An embodiment example of the latter was exhibited at the International Pulsed Power Conference 1981 in paper 16.3 in Albuquerque, N. Mex.

According to a first embodiment example, the laser chamber LK is further provided with means for conducting the laser gas transversely to the optical axis OA of the laser, which is indicated by arrows G1 in FIGS. 1 to 3.

For example, the high-energy laser according to the invention may be an excimer laser or a $CO_2$ laser; the gas composition and the physics of the discharge processes of the former are described in detail, for instance, in the journal "Physics Today", May 1978, Pages 32 to 39, for which reason an explanation can be dispensed with herein.

In particular, FIG. 1 shows that the mutually opposite laser electrodes E1, E2 are each formed of two subelectrodes E11, E12 and E21, E22, respectively, wherein E11 and E12 are electrically and mechanically connected together by the electrode bridge b1. The electrode bridge b1 is an elongated plate disposed parallel to the laser axis; the subelectrodes are metal strips extending in the same direction. The subelectrodes E21, E22 are supported by the current return plates e1 and are provided with electrical contacts which, as will be explained later on, are provided between the subelectrodes E21, E22 with electrical feedthroughs for the current leads e1. The current returns e2 are constructed as highly conductive metal plates. They may be provided with low density or at a small distance from rod, pin, or bolt-like current leads e1 as a bridge plate with corresponding cutouts for the feedthroughs; in the embodiment example, e2, e2 are separate plate parts. The subelectrodes E11, E21 and E12, E22 which are disposed opposite each other in pairs, define gas-discharge spaces 1 between them, which can also be referred to as subdischarge spaces because they are divided among two subelectrode pairs. Disposed in a space m between the subdischarge spaces 1,1 are insulation-jacketed current leads. The leads are designated as a whole with reference symbol e1, and they are provided for the electrode bridge b1 of the subelectrodes E11, E12 facing away from the pulse-forming network PFN. These current leads e1 are brought in an insulated manner through the subelectrode space between the subelectrodes E11 and E12, through the space m between the two subdischarge spaces 1,1, as well as between the oppositely disposed subelectrodes E21 and E22 and the corresponding current return e2 of the second electrode E2. The current leads e1 extend up to the corresponding strip-line capacitor contact surface, in this case the surface of the connecting tab f1 of a capacitor electrode of the pulse-forming network PFN, and they are electrically connected thereto. A suitably flattened connecting strap e11 serves this purpose at the current lead e1. The capacitor electrode belonging to the connecting tab f1 is indicated in lines with dashes at reference symbol c1. The contact between the strap e11 and the tab f1 is preferably established by hard soldering or welding, but screw connections are basically also possible. At the other end of the current lead e1, a similar flush contact is made between the current lead e1 and the electrode bridge b1 by screwing-in and/or hard soldering or welding. The current returns e2 are likewise provided with contacts through connecting tabs c21 of the capacitor electrode c2 of the pulse-forming network PFN, which are not shown in detail, wherein the electrode c2 has a cutout c20 formed therein in the region of the feedthrough.

As FIG. 1 shows in conjunction with FIG. 2, the jacketed current leads e1 are disposed at a distance a3 from each other in the direction of the laser axis OA, so that spaces 5 extending transversely to the laser axis for the transversal gas flow G1 are formed.

FIGS. 1 and 2 further show that the current leads e1 are provided in the form of pin, rod or bolt-like conductor rods 6, which are tapered at least at a subsection thereof along the distance a1 which corresponds to the subdischarge spaces 1, traversing the gas space. The conductor rods 6 are disposed between oppositely disposed subelectrodes E11, E12 and E21, E22, so that respective cavities 8 are formed between the conductor rod 6 of the current lead e1 and its insulating jacket 7. Through the cavities 8, the wave impedance for sliding sparks at the surface of the insulating jackets 7 is increased. The length of the cavities can also be made larger than the distance a1 but if possible it should not be made smaller. The insulating jackets 7 of the individual conductor rods 6 are formed of a temperature-resistant, UV-radiation resistant plastic, such as PVDF (Polyvinylidene fluoride), or are small tubes formed of high-purity $Al_2O_3$ ceramic. For reasons of better field distribution, the transition in the conductor rod 6 from the full cross section at its ends to the tapered cross section in its middle region is steady or in the shape of a flat S, as illustrated by example in FIGS. 1 and 2. In the vicinity of the end of the conductor rod 6 of the current lead e1, facing the pulse-forming network PFN, the insulating jacket 7 is provided with an enlargement or base portion 7a of substantially greater wall thickness. This enlargement 7a may be a hollow cylinder if enough space is available, but it may also be constructed, as shown, as an insulating material strip with corresponding through-holes 7b.

The base portion 7a contains shield electrodes E3 in chambers 7c formed in the wall thereof. The shield electrodes E3 are electrically connected to the ground potential of the current returns e2 by connecting conductors e3. The shield electrodes E3 extend over spaces m1 between the subelectrodes E21, E22 of the second electrode E2 on one hand, and the current lead e1 on the other hand. A particular advantageous construction is that of the shield electrodes E3 being in the form of blades on both sides of the current lead e1 or in the form of rows of pins, which extend into the chamber 7c or the space m1. The shield electrodes E3 are surrounded by wall parts of the chambers 7c which have an approximately U-shaped cross section. The blade-shaped shield electrodes E3 shown can be connected very easily in a mechanically and electrically strong manner to the current return plates e2 by the connecting conductors e3, such as contact straps, and can be inserted into corresponding non-illustrated slots making contact.

The shield electrodes E3 preferably extend into the gas space G, m1 at least as far as the region of the subelectrodes E21, E22 and their corresponding pre-ionization electrodes V2 extend transversely to the laser axis.

The subelectrodes E11, E12 and E21, E22, respectively, are preferably screwed into their corresponding electrode bridges b1 or current return plates e2; a satisfactory contact pressure between their contact surfaces and the corresponding counter surfaces can thereby be obtained and the subelectrodes can easily be replaced, if necessary. Through the cavities 8 between the conductor rods 6 of the current leads e1 and the insulating jackets 7, the wave impedance for sliding sparks at the surface of the insulating material is increased, as mentioned above, which counteracts the tendency toward forming sliding sparks in the same manner as the construction of the shield electrodes E3 with their jacket 7a. Since the auxiliary electrodes V2 for the pre-ionization are at the potential of the current lead e1, a strong field is built up between them and the corresponding subelectrodes E21, E22, which leads to the desired predischarge. On the other side, a corresponding strong field is built up between the auxiliary electrodes V1, which are at the potential of the current return e2, and the directly opposite subelectrodes E11, E12. On this side of the laser chamber, however, it is possible to make do without special measures for preventing sliding sparks because the current lead e1, electrode bridge b1, as well as the electrodes E11 and E12 are at nearly the same potential.

FIG. 2 shows that a chamber-like configuration of the spaces 5 and the conductor rods 6 with their insulating jackets 7 is obtained with relatively low flow resistance for the laser gas G1. The outer shape of the insulating body 7 must be particularly adapted to aerodynamic requirements for a flow resistance which is as low as possible. Thus, for instance, the disposition of the flow canals defined by the spaces 5 may be provided in the form of a diffuser or Venturi tube in the direction of the gas flow; through such an aerodynamic shape, pumping power can be saved.

It can be seen from FIG. 3 that the electrode assembly E1, E2 is placed in the afore-mentioned housing 2, which is also referred to as a tank. The material forming the tank is resistant to aggressive laser gases which represent a mixture of rare gases with halogens or halogen-containing compounds or it may also contain nitrogen and carbon dioxide mixtures. Inflow and outflow funnels 9, 10 are connected to an external gas circulation loop which contains blowers and corresponding gas purification and gas cooling units. A partition 11 of insulating material prevents the gas from flowing past the discharge space 1,1.

This assembly as well as the assembly described below with reference to FIG. 4, permits the connection of both discharge gaps E11 to E21 and E12 to E22 in series through mirrors or other optical elements or the operation thereof as parallel amplifiers or oscillators.

Figure 4:
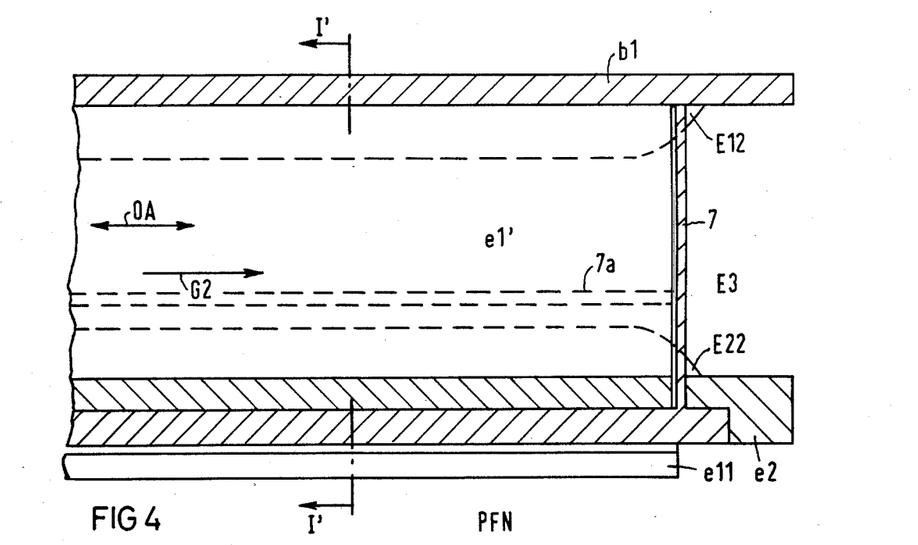

In the embodiment example according to FIG. 4 with which, as already mentioned, the cross-sectional view according to FIG. 1 can also be associated, the gas space G or the two partial discharge spaces 1,1 are traversed by the laser gas in the direction of the optical axis OA (see the arrow G2). This makes sense if the laser is to be operated only with a low repetition frequency and therefore the gas exchange between two successive laser pulses is ensured in the case of a longitudinal gas flow. In this case, the insulation-jacketed current lead e1' is a wide, continuous plate-shaped body without cutouts, which in addition has the advantage of providing a lower inductance. Therefore, the spaces 5 shown in FIG. 2 are eliminated; the insulating jacket 7 is rather, like the current lead e1', a continuous plate-shaped body. It is also within the scope of the present invention to construct the current lead e1 as a plate-like body with cutouts for the gas flow in the case of a transversal laser gas flow according to the arrows G1, and to enclose such a perforated body by the insulating jacket 7, in a non-illustrated manner.

Figure 5:
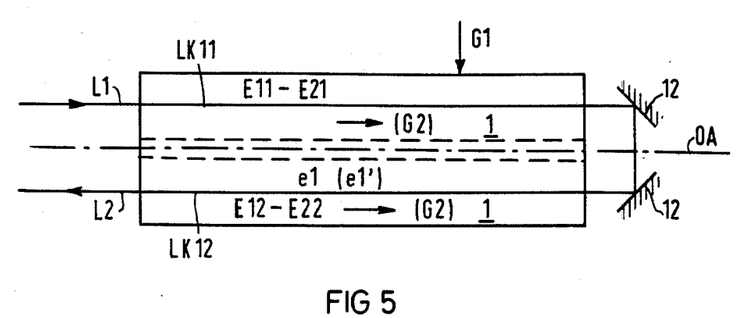
FIG. 5 is a side-elevational view of the optical tandem-arrangement of the two partial discharge spaces of a laser according to FIG. 1.

FIG. 5 shows the laser according to FIGS. 1 to 3, in a greatly simplified presentation; its two subdischarge spaces 1,1 are connected optically in tandem between the subelectrodes E11 to E21 and E12 to E22, respectively, which are disposed opposite each other in pairs. The subelectrodes are connected together through ray reflection devices 12, in the sense of an optical amplifier, so that the laser light beam L1, after passing through the first laser subchamber LK11, being reflected twice at the ray deflection devices 12, 12, and after passing through the second laser subchamber LK12, leaves the subchamber LK12 as an amplified laser beam L2. The transversal gas flow is indicated by the arrow G1 and the current lead indicated by dotted lines at e1. In principle, however, a longitudinal gas flow G2 can also be used with a corresponding plate-shaped current lead e1'. In particular mirrors, prisms, grids or the like can be considered as ray deflection devices 12. In the case shown, two metal mirrors are used which are inclined 45° to the laser beam or the optical axis OA, respectively.

Figure 6:
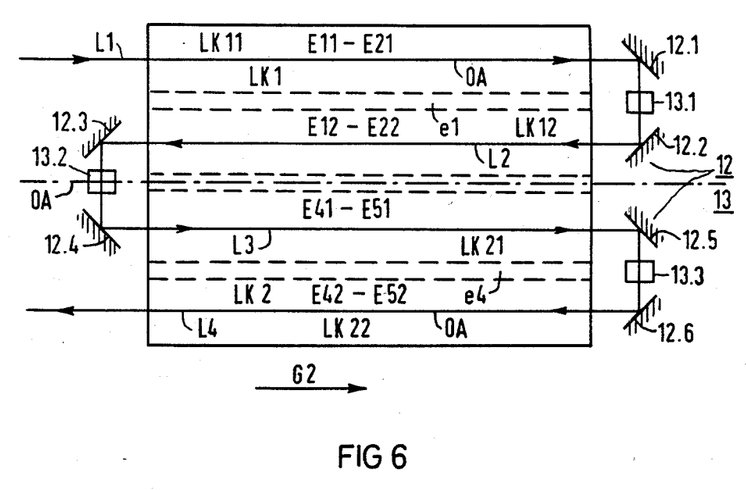
FIG. 6 is a side-elevational view of the optical tandem-arrangement of the four partial discharge spaces of a multiple laser system including two lasers according to FIG. 1.

In the fourth embodiment example according to FIG. 6, several laser chambers LK1, LK2 each having two oppositely disposed subelectrode pairs, are aligned in the transverse direction, relative to their optical axes OA, to form a multiple laser system. The individual laser chambers LK1, LK2 and the laser subchambers LK11, LK12 etc. of the multiple laser system are optically connected in series with their partial discharge spaces through the beam deflection devices already explained in connection with FIG. 5. The laser chambers and subchambers are designated as a whole with reference numeral 12 and in detail, with numerals 12.1 to 12.6. This connection is made in such a manner that the laser light beam L1 leaves the second laser subchamber LK12 after double reflection as a beam L2, passes as a laser beam L3 through the third laser subchamber LK21 after double reflection at 12.3 and 12.4 and, after double deflection at 12.5 and 12.6, leaves the fourth laser subchamber LK22 as the laser beam L4 which is amplified accordingly. As the directional arrows at the laser beams L1 to L4 illustrate, the multiple laser system is to radiate in this case in one preferred direction and not in the other direction. In order for this to be ensured under all operating conditions, disposed between the ray deflection devices 12 in the desired beam direction, are optical elements 13 which are permeable, as so-called unidirectional elements. The unidirectional elements may be formed of saturable light absorbers, that are known per se, or of so-called Faraday rotators. In the embodiment example shown, three such optical elements 13.1 to 13.3 are inserted into the ray path, each between two adjacent deflection devices. The preferred gas flow direction for this embodiment example is longitudinal (see arrow G2), but a transverse gas flow may also be of advantage, especially if special flow canals are provided between the adjacent laser chambers. In FIG. 6, the subelectrodes of the first laser chamber LK1 are designated as in FIG. 5; in the second laser chamber LK2, the mutually opposite subelectrodes are designated with reference symbols E41 to E51 and E42 to E52.

The foregoing is a description corresponding to German Application No. P 31 36 447.0, dated Sept. 14, 1981, International priority of which is being claimed for the instant application and which is hereby made part of this application. Any discrepancies between the foregoing specification and the corresponding German application are to be resolved in favor of the latter.

We claim:

1. A laser of the TE type, comprising: a gas-tight housing defining a discharge chamber, at least two first and second laser electrodes disposed parallel to the optical axis of the laser within said housing of said discharge chamber, a gas space between and defined by said laser electrodes, said electrodes being disposed mutually opposite and at a given distance from each other, excitation of the laser being provided by an arc-free capacitor discharge being highly homogeneous in said gas space between said electrodes, a pre-ionization device disposed within said housing of said discharge chamber, current leads and a current return conductor disposed in said housing of said discharge chamber, each of said electrodes being connected to one of said current leads and current return conductor, means for conducting laser gas through said discharge chamber, a pulse-forming network having a capacitor contact surface and being connected to said current leads and current return conductor, each of said mutually opposite laser electrodes having at least two subelectrodes, said subelectrodes of one of said electrodes facing toward said pulse-forming network and said subelectrodes of the other of said electrodes facing away from said pulse-forming network, an electrode bridge connected to said subelectrodes of said electrodes facing away from said pulse-forming network, said subelectrodes of said respective mutually opposite electrodes defining subdischarge spaces therebetween and a subelectrode space between said subdischarge spaces, and insulation jackets disposed on said current leads, said jacketed current leads being extended from said electrode bridge through said subelectrode space, through said current return conductor and to said capacitor contact surface.

2. A laser according to claim 1, wherein said laser gas flow is transverse to the optical axis of the laser, and said insulation jacketed current leads are individual bodies being mutually spaced apart by a given distance along the optical axis of the laser, forming spaces for said laser gas flow transverse to the optical axis of the laser.

3. A laser according to claim 2, wherein said current leads are pin or bolt-shaped conductor rods being tapered in a region thereof extended through said gas space between opposite subelectrodes of said mutually opposite electrodes, forming cavities between said conductor rods and said insulating jackets.

4. A laser according to claim 3, wherein said conductor rods have a uniform transition region from a full cross-sectional area to a tapered cross-sectional area thereof.

5. A laser according to claim 3 or 4, wherein said cavities extend in direction transverse to the optical axis of the laser at least from a location between said subelectrodes of said one electrodes facing toward said pulse-forming network to a location between said subelectrodes of said other electrodes facing away from said pulse-forming network.

6. A laser according to claim 1, wherein said laser gas flow is transverse to the optical axis of the laser, and said insulation jacketed current leads are a continuous plate-shaped body having perforations formed therein forming spaced for said laser gas flow transverse to the optical axis of the laser.

7. A laser according to claim 1, wherein said laser gas flow is parallel to the optical axis of the laser, and said insulation jacketed current leads are continuous plate-shaped bodies.

8. A laser according to claim 1, wherein said subelectrodes of said one electrodes facing toward said pulse-forming network are disposed at a distance from said insulation jacketed current leads defining further spaces therebetween, and including shield electrodes having insulation jackets and being electrically connected to said current return conductor and being extended into said further space.

9. A laser according to claim 8, wherein said pre-ionization device includes electrodes disposed parallel to the optical axis of the laser at a distance from said laser electrodes in said gas space, and said shield electrodes are extended transverse to the optical axis of the laser into said gas space at least as far as said subelectrodes of said one laser electrodes facing toward said pulse-forming network and at least one of said pre-ionization electrodes.

10. A laser according to claim 8 or 9, wherein said shield electrodes are blade-shaped and are extended into said gas space from said current return conductor, and including a substantially U-shaped insulation jacket surrounding said shield electrodes.

11. A laser according to claim 8, wherein said insulation jackets of said current leads and shield electrodes are connected at said shield electrodes into an enlarged base portion having chambers formed therein for receiving said shield electrodes.

12. A laser according to claim 1, wherein said subelectrodes form two subdischarge spaces, and including ray deflection devices optically connecting said two subdischarge spaces in tandem between said subelectrodes.

13. A laser according to claim 12 or 16, including saturable absorbers disposed in a path between said ray deflection devices.

14. A laser according to claim 12, including Faraday rotators disposed in a path between said ray deflection devices.

15. A laser according to claim 1, wherein said discharge chamber is subdivided into a plurality of chambers enclosing said subdischarge spaces each having two opposite subelectrode pairs, said chambers being aligned transverse to the optical axis of the laser forming a multiple laser system.

16. A laser according to claim 15, including ray deflection devices optically connecting said chambers of said multiple laser system enclosing said subdischarge spaces in series.

17. A laser according to claim 16, including means for generating a longitudinal laser gas flow.

18. A laser according to claim 14, including Faraday rotators disposed in a path between said ray deflection devices.

* * * * *